United States Patent [19]

Müller et al.

[11] Patent Number: 5,140,409
[45] Date of Patent: Aug. 18, 1992

[54] METHOD AND APPARATUS FOR DERIVING A COLOR CONTROLLED VIDEO MIXER KEYING SIGNAL

[75] Inventors: Klaus-Dieter Müller, Weiterstadt; Bernhard Kreling, Darmstadt, both of Fed. Rep. of Germany

[73] Assignee: BTS Broadcast Television Systems GmbH, Darmstadt, Fed. Rep. of Germany

[21] Appl. No.: 581,277

[22] Filed: Sep. 12, 1990

[30] Foreign Application Priority Data

Sep. 30, 1989 [DE] Fed. Rep. of Germany ....... 3932757

[51] Int. Cl.⁵ .................... H04N 9/74; H04N 5/262
[52] U.S. Cl. .................................. 358/22; 358/183; 358/178
[58] Field of Search ............... 358/22, 178, 172, 183, 358/150

[56] References Cited

U.S. PATENT DOCUMENTS

| | | | |
|---|---|---|---|
| 4,051,520 | 9/1977 | Davidse | 358/22 |
| 4,758,892 | 7/1988 | Bloomfield | 358/22 |
| 4,947,255 | 8/1990 | Jackson et al. | 358/183 |
| 4,963,977 | 10/1990 | Jackson et al. | 358/22 |
| 4,994,905 | 2/1991 | Lee et al. | 358/183 |

FOREIGN PATENT DOCUMENTS 0267553  5/1988  European Pat. Off. .

OTHER PUBLICATIONS

SMPTE Journal, Mar. 1977, vol. 86, "Chroma-Key System Insensitive to Variations of the Background Illumination" pp. 140-143.

*Primary Examiner*—James J. Goody
*Assistant Examiner*—Glenton B. Burgess
*Attorney, Agent, or Firm*—Frishauf, Holtz, Goodman & Woodward

[57] ABSTRACT

For deriving a keying signal for a video mixer from a video pattern signal which may be derived by reference to the presence of a selected color in one of the video signals to be mixed, the level-shift voltage added to the video signal for producing the clipped video pattern signal, instead of being constant, is derived from at least one amplitude envelope signal produced from the video signal in order to overcome effects of non-uniform lighting or shadow effects in the picture that contains a selected color. The clip voltage is about half of the amplitude envelope signal. Preferably, both positive and negative amplitude envelope signals are generated and the level-shift voltage is then the mean value of the voltages contemporaneously represented by the envelope signals. The envelope signals are stored for a picture field interval before being used to generate the level-shift voltage.

9 Claims, 2 Drawing Sheets $$U_{ab} = n \cdot U_{+H}$$

$$U_{ab} = U_{-H} + n \cdot (U_{+H} - U_{-H})$$

METHOD AND APPARATUS FOR DERIVING A COLOR CONTROLLED VIDEO MIXER KEYING SIGNAL

This invention concerns the derivation of a video signal for inserting a first scene within the display of a second scene on the basis of the absence of a selected color in one of those two scenes, utilizing a keying or stamp-out signal derived by selective color detection, a video signal which is supplied to a limiter circuit together with a clipping or cutover potential.

The methods and apparatus of the above-described kind are frequently used in television for mixing very different pictures, for example in transitions between one scene and another and such procedures are commonly known as the chromakey procedure or blue-wall method and sometimes as the color-stamp method because the inserted picture seems to be inserted where the previously fully displayed picture has been stamped out.

The stamped out picture can in principle be either a foreground picture or a background picture in which, respectively, a background or a foreground picture is inserted. It will be assumed for convenience of description that the foreground picture contains, at least in an important part thereof, a preselected color—usually a blue color—which is not present in a background picture the video signal of which is to replace the video signal of the foreground picture in a certain picture area. Both signals are supplied to a picture mixer which permits the transmission of one or the other of the picture signals in accordance with a video mixing signal that provides a transition, which may be sharp or soft, between the two signals.

The actual signal supplied to the picture mixer is a mixer keying signal that is derived from the foreground signal as well from the video mixing signal above mention. Various systems are known for providing a selection of the color to be replaced in a particular case and a setting of the color selected for defining the keying signal. The video mixing signal thus obtained is supplied to a limiter circuit of which the so-called clip or clipping potential and the amplification can be set. The setting of these magnitudes can be highly critical in certain circumstances, because for example a blue wall foreground, as the result of non-uniformities of lighting or shadow effects might not have a uniform color over the entire surface of the foreground. As a result both the white value as well as the black value within the picture can be subjected to changes so that in the known methods for stamp-out signal derivation a favorable setting of the clip potential can be obtained only for a part of the picture.

SUMMARY OF THE INVENTION.

It is an object of the present invention to provide a method and apparatus with which even under non-uniform lighting or shadowing of a blue wall or other suitable surface, it will still be possible to obtain an optimal mixer keying signal.

Briefly, the clip potential is controlled in a manner dependent upon the amplitude of the video pattern signal. More particularly and preferably, a positive envelope curve of the video mixing signal is derived and the clip potential is given the same course as the envelope curve but with reduced amplitude. Both a positive and a negative envelope curve can advantageously be produced, in which case the clip potential is determined by a median between the two envelope curves, which may conveniently be in terms of the arithmetic mean.

The method of the invention is suitable both for color-controlled mixer keying signals and for keying methods for monochrome video signals utilizing a luminance difference. In the latter case the preliminary step of defining a color selection signal is dispensed with.

BRIEF DESCRIPTION OF THE DRAWINGS.

The invention, and particularly its apparatus aspects, is further described by way of illustrative example with reference to the annexed drawings, in which.

The same parts in the several figures are designated with the same reference numerals.

DESCRIPTION OF THE ILLUSTRATED EMBODIMENTS.

Figure 1:
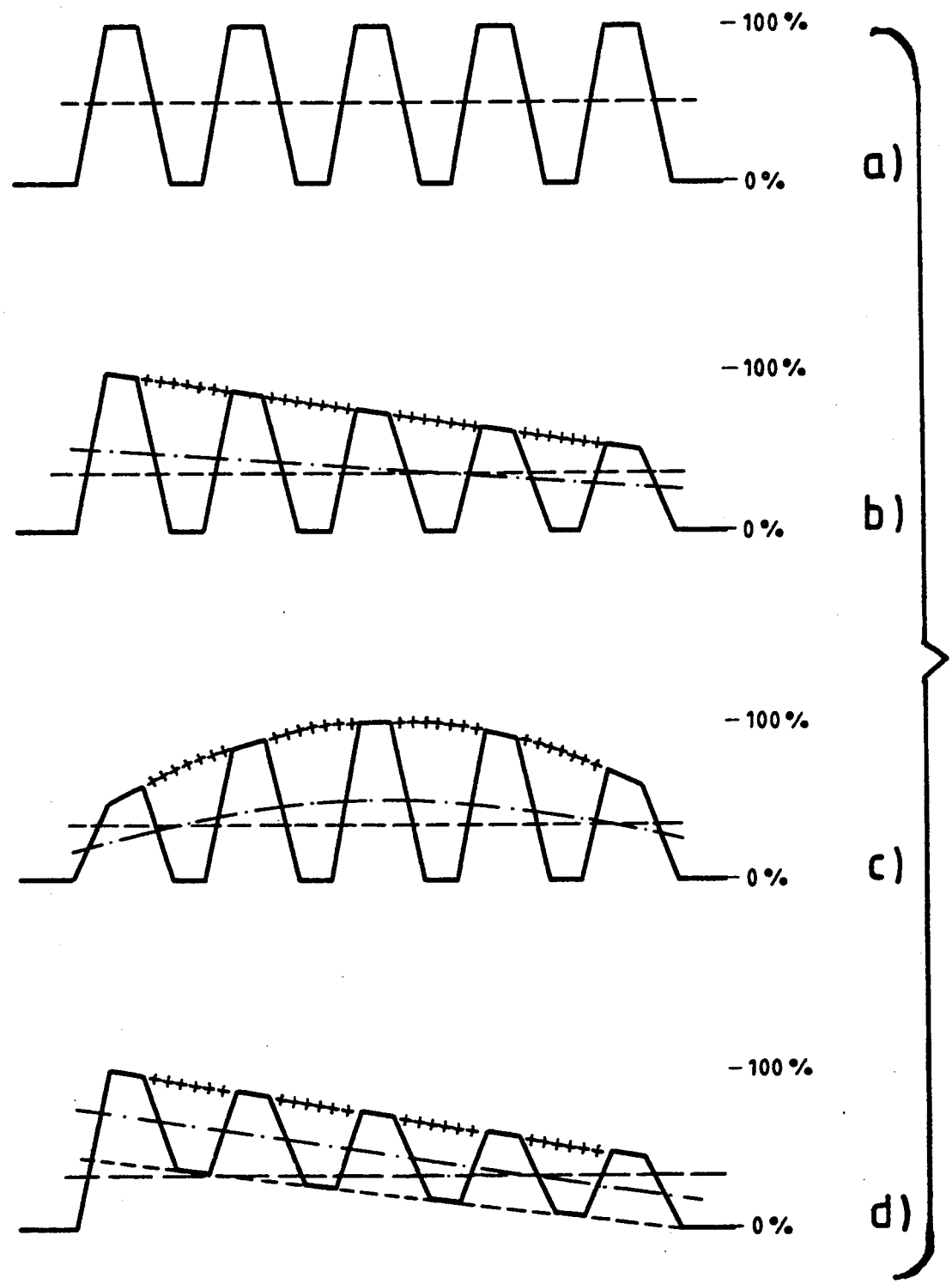
FIG. 1 is a graphical representation of an assortment of various signals drawn to the same time scale for explaining the method of the invention.

Graph (a) of FIG. 1 schematically shows a video mixing signal produced with ideal illumination of a uniform surface. The signal runs between a black value (0%) and a white value (100%). The illustrated time interval can for example correspond to a line or to a picture field, the difference being of no consequence for the explanation of the invention. The broken line represents a clip potential such as is set in known circuits.

Graph (b) of FIG. 1 shows a video mixing signal in which the white value gradually declines as the result of non-uniform illumination within a line or within a picture field. When there is a constant clip potential, which is indicated by the broken line, the result is a varying ratio of clip potential with reference to the contemporaneous amplitude. In the illustrated case the width of the individual pulses of the keying is reduced from the left towards the right of the graph. Transitions between the foreground and the background as produced in the known method appear with different degrees of definition according to the particular location in the picture.

The effect shown in graph (b) by the broken line is avoided in the method of the invention which provides a time-variable clip potential. The clip potential according to the method of the invention is shown in (b), (c) and (d) of FIG. in chain-dotted lines. It is the envelope curve reduced in amplitude, as above stated.

In the case of the signal course shown in graph (b), the clip potential can be obtained from the positive envelope curve, which is shown schematically by a sequence of plus signs. Graph (c) shows another video mixing signal in which, as in the case of the signal shown in graph (b), non-uniform illumination is noticeable only from the white value. In this case there is a decline of the signal amplitude from the middle of the picture towards the edges. A corresponding course is accordingly provided for the clip potential, illustrated by the chain-dotted line. The clip potential lies at approximately half of the envelope curve. Other settings are possible according to the requirements in individual cases.

Graph (d) shows a video mixing signal in which both the white value and also the black value show a change that is inherently undesirable. In order to derive a clip potential by the present invention for such a video signal, both the positive envelope curve (+++) and the negative envelope curve (---) are derived with known types of envelope curve generators, and from these curves the arithmetic mean value is produced to obtain the clip potential.

It is evident from graph (d) that it is hardly possible to derive a keying signal from the distorted video mixing signal shown by the known method, because the most strongly raised black value is only slightly less than the lowest white value and therefore only a very small amplitude range is made available for a constant clip potential (broken line made up of long strokes).

Figure 2:
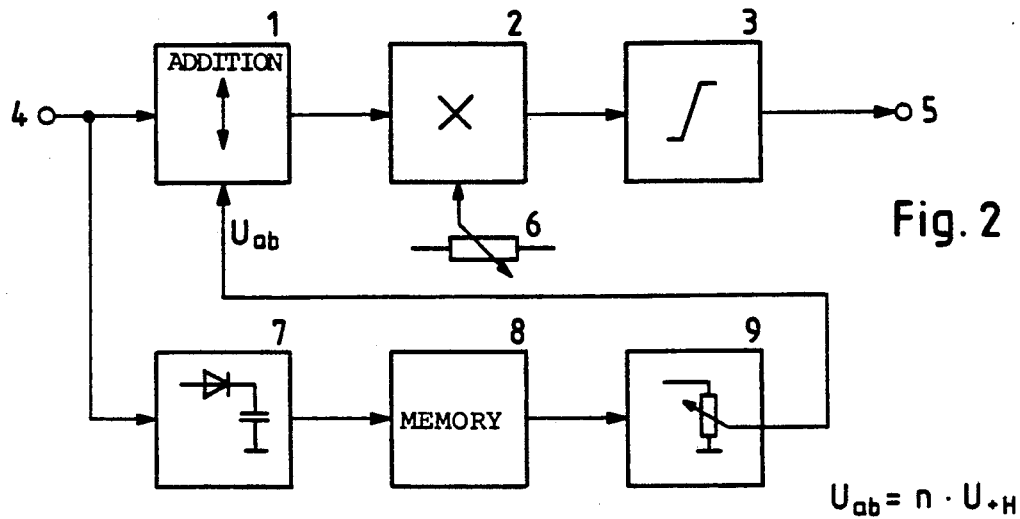
FIG. 2 is a circuit block diagram of a first embodiment of the apparatus of the invention.

FIG. 2 is a circuit block diagram of a first embodiment of the apparatus of the invention. In the circuit shown there is, in the usual way, a circuit 1 for shifting the potential of the video mixing signal supplied at 4, a multiplier circuit 2 and a two-sided limiter 3. A voltage for setting the amplification is supplied to the multiplier circuit 2. For setting this voltage a potenitometer 6 is shown in FIG. 2. The mixer keying signal is made available at the output 5 of the limiter circuit.

In the operation of the circuit 1 a voltage $U_{ab}$ representating the clip potential is simply added to the video mixing signal. For that reason the level-shifting circuit 1 is called an addition circuit.

The use of the circuits 1 to 3 for producing a mixer keying signal is in itself known and does not need to be described further. In the known circuits a clamp circuit is often used as the addition circuit 1. In that case the clamp potential is set at $U_{ab}$. It is also possible to use differential amplifiers. In the apparatus of the invention circuits are preferably used which permit an addition of the video mixing signal and a time varying signal, thus for example differential amplifiers.

Figure 3:
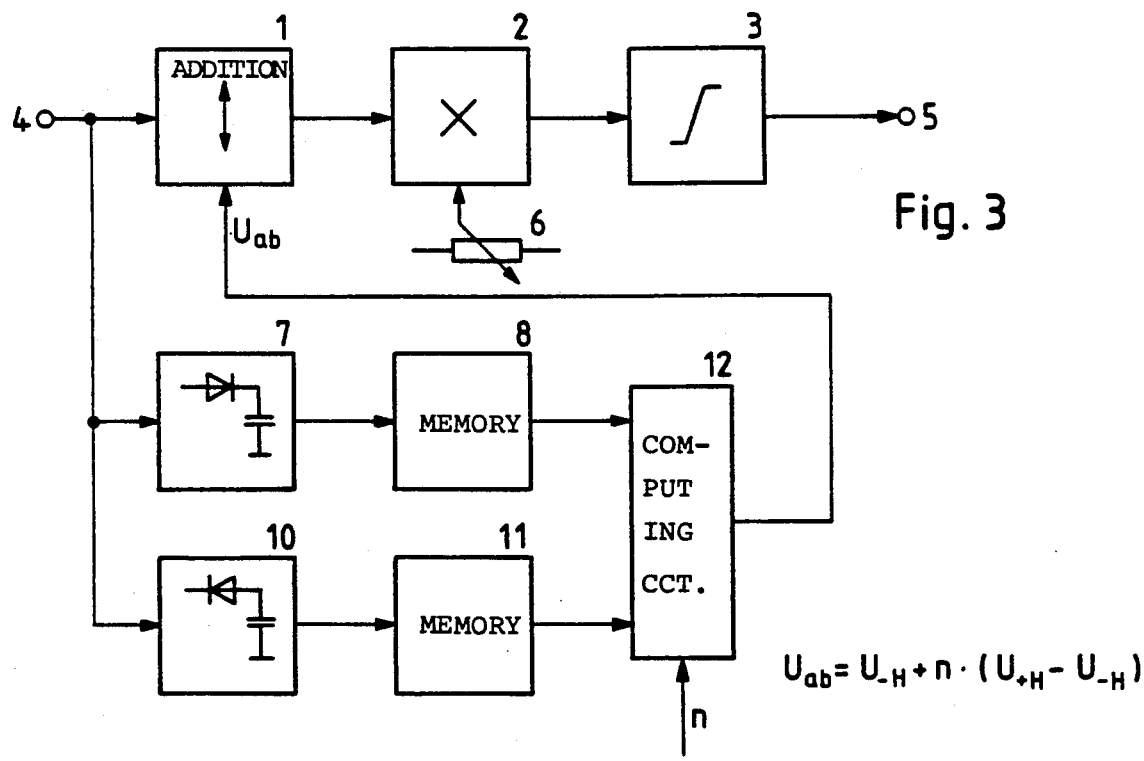
FIG. 3 is a circuit block diagram of a second embodiment of the apparatus of the invention.

For carrying out the method of the invention, the video signal is supplied to an envelope curve generator 7 which in the illustrated case includes by a peak-detecting rectifier circuit. It is impossible to provide an envelope curve generator by means of a peak detector alone. The complete circuits for envelope curve generators are, as above mentioned, well known. The peak detector symbol used in FIG. 2 and FIG. 3 is used mainly to show the polarity of the envelope curve detector, as is evident form the envelope curve detectors 7 and 10 shown in FIG. 3. The positive envelope curve obtained in the envelope signal generator 7 is stored in a suitable memory 8 for one picture. The observed value of the envelope curve for the particular picture element (pixel) are read out of the memory 8 and supplied to an adjustable amplitude attenuator 9, the output of which is supplied as the varying level shift potential $U_{ab}$ of the addition circuit 1.

In the embodiment illustrated in FIG. 3 an additional envelope curve generator 10 is provided which generates a negative envelope curve from the negative peak values. This negative envelope curve is stored in an additional memory 11. Values of both envelope curves are read out of the respective memories 8 and 11 and supplied to a computing circuit 12 that calculates a mean value in accordance with the formula $U_{ab} = U_{-H} + n \cdot (U_{+H} - U_{-H})$, which appears also in FIG. 3. The computing circuit is preferably a logic circuit or a corresponding programmed read-only memory (PROM).

As shown in FIGS. 2 and 3, the varying level shift voltage $U_{ab}$ can be adjusted by a factor n that is adjustable between the values of 0 and 1. In the case of FIG. 3, therefore, $U_{ab}$ can be set between the negative envelope curve (n=0) and the positive envelope curve (n=1). When n=½ the value of $U_{ab}$ corresponds to the arithmetic mean between the envelope curves.

The circuits of FIGS. 2 and 3 can be implemented in digital circuit technology as well as in analog circuit technology. When implemented in analog technology, ditigal memories 8 and 11 are preferably provided and these are connected to the analog components of the circuit by analog-to-digital and digital-to-analog converters which are not shown in the drawing.

Although the invention has been described with reference to particular illustrative examples, it will be understood that variations and modifications are possible within the inventive concept.

We claim:

1. Apparatus for producing a keying signal for a video mixer, said apparatus having an addition means, which is saturable at a clip potential, for adding a level-shift potential to a video pattern signal and respective multiplier an limiter circuits for producing said keying signal from a signal derived from an output of said addition means, said limiter being capable of limiting its output signal both as to positive voltage and as to negative voltage, and further comprising:

means (7) for generating a positive amplitude envelope signal derived from said video pattern signal and conforming at least proportionally to its positive envelope;

memory means (8) for storing said positive envelope signal for at least a picture field interval, and means for reading out the signal stored in said memory and supplying it as a variable level-shift potential to said addition means for addition to said video pattern signal.

2. The apparatus of claim 1, wherein an amplitude attenuator is interposed between said memory means and said addition means for adjusting the magnitude of the signal read out of said memory and supplied to said additional means.

3. The apparatus of claim 1, further comprising means (10) for generating a negative amplitude envelope signal derived from said video pattern signal and conforming at least proportionally to its negative envelope and an additional memory means (11) having a write-in input connected to the output of said negative envelope signal generating means, for storing said negative amplitude envelope signal, as well as means for reading out the signal stored in said additional memory means, and also computing means (12), having an input connected to both said reading-out means, for computing values each of which is a mean value with respect to contemporaneously read-out values respectively of said amplitude envelope signals, and supplying a succession of said mean values for supply, by said means for supplying said memory-stored signal, of a level-shift voltage applied to said addition means.

4. The apparatus of claim 3, wherein said computing means (12) is constituted as a logic circuit.

5. A method of deriving a video mixer keying signal from a video mixing signal comprising the steps of:

deriving from said video mixing signal an amplitude envelope signal of a predetermined polarity;

storing said amplitude envelope signal for at least a picture field interval and reading it out from storage in synchronism with said video mixing signal, supplying said read-out amplitude envelope signal or a voltage-proportional part thereof to a first input of an addition circuit as a level-shift potential and supplying said video mixing signal to a second input of said addition circuit under conditions at which said video mixer signal is clipped in said addition circuit at a variable level which is proportional to and smaller than said signal which is supplied to said first input of said additional circuit, and thereby producing a modified video mixing signal;

muiltiplying said modified video mixing signal in amplitude by a selectable factor, and limiting said multiplied modified video mixing signal to produce a video keying signal.

6. The method of claim 5, wherein only a voltage-proportional part of said amplitude envelope signal is applied as a variable level-shift potential to said video mixing signal for producing said modified video mixing signal.

7. The method of claim 6, wherein said voltage-proportional part of said amplitude envelope signal is a fraction thereof which is about half of said amplitude envelope signal.

8. A method of deriving a video mixer keying signal from a video mixing signal comprising the steps of:

deriving from said video mixing signal a positive amplitude envelope signal;

deriving from said video mixing signal a negative amplitude envelope signal;

storing said amplitude envelope signals respectively in separate memories for at least a picture field interval and reading them out from storage in synchronism with said video mixing signal;

supplying said read-out positive and negative amplitude envelope signals to a combining and computing circuit and providing at an output thereof a mean value signal corresponding to successive mean values of contemporary values said respective positive and negative amplitude envelope signals;

supplying said mean value signal or a voltage-proportional part thereof as a level-shift signal to a first input of an addition circuit and supplying said video mixer signal to a second input of said addition circuit under conditions in which said video mixing signal is clipped in said addition circuit at a variable level which is proportional to said mean value signal supplied to said first input of said addition circuit, and thereby producing a modified video mixing signal;

multiplying said modified video mixing signal in amplitude by a selectable factor, and limiting said multiplied modified video mixing signal to produce a video mixer keying signal.

9. The method of claim 8, wherein said mean value signal is an arithmetic mean value signal.

* * * * *